(12) United States Patent
Hwang et al.

(10) Patent No.: US 11,553,075 B2
(45) Date of Patent: Jan. 10, 2023

(54) APPARATUS AND CONTROL METHOD FOR RECOMMENDING APPLICATIONS BASED ON CONTEXT-AWARENESS

(71) Applicant: LG ELECTRONICS INC., Seoul (KR)

(72) Inventors: Jeong Hwan Hwang, Seoul (KR); Dae San Kang, Seoul (KR); Byeong Soo Kim, Seoul (KR); Ji Yeon Kim, Seoul (KR); Hee Jin Kim, Seoul (KR); Yoon Ok Nam, Seoul (KR); Ji Young Lee, Seoul (KR); Ji Na Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 613 days.

(21) Appl. No.: 16/599,695

(22) Filed: Oct. 11, 2019

(65) Prior Publication Data

US 2020/0045163 A1 Feb. 6, 2020

(30) Foreign Application Priority Data

Sep. 2, 2019 (KR) .......................... 10-2019-0108330

(51) Int. Cl.
*H04M 1/72454* (2021.01)
*G06N 3/08* (2006.01)
(Continued)

(52) U.S. Cl.
CPC .......... *H04M 1/72454* (2021.01); *G06N 3/08* (2013.01); *H04M 1/72451* (2021.01); *H04M 1/72469* (2021.01)

(58) Field of Classification Search
CPC ......... H04M 1/72454; H04M 1/72469; H04M 1/72451; G09G 5/14; G09G 2354/00;
(Continued)

(56) References Cited

U.S. PATENT DOCUMENTS 9,448,692 B1 * 9/2016 Mierau ................. G06F 3/0488
9,658,738 B1 * 5/2017 Park ...................... G06F 16/903
(Continued)

FOREIGN PATENT DOCUMENTS

KR 1020160017532 2/2016
KR 1020170077714 7/2017

*Primary Examiner* — Xilin Guo
(74) *Attorney, Agent, or Firm* — Lee Hong Degerman Kang & Waimey

(57) ABSTRACT

Disclosed are an apparatus and control method for recommending an application based on a recognized situation of a user of an electronic device by executing an artificial intelligence (AI) algorithm and/or machine learning algorithm in a 5G environment connected for the Internet of Things and a driving method thereof. The apparatus control method according to an embodiment of the present disclosure includes applying context information including at least one of environmental information collected through a sensor of the electronic device or a network, or usage information generated by the use of the electronic device to a machine learning based first learning model in response to a user input, and displaying, on a display, a first shortcut related to an application determined on the basis of a result of applying the context information to the first learning model and displaying, on the display, a second shortcut related to a preset application.

21 Claims, 14 Drawing Sheets

(51) Int. Cl.
*H04M 1/72451* (2021.01)
*H04M 1/72469* (2021.01)

(58) Field of Classification Search
CPC ........ G06N 3/08; G06N 3/0454; G06N 20/00;
G06F 3/0482; G06F 3/167; G06F 3/013;
G06F 3/011; G06T 2207/20081; G06T
2207/20084; G06T 7/70; G06T 7/20
See application file for complete search history.

(56) References Cited

U.S. PATENT DOCUMENTS

| | | | |
|---|---|---|---|
| 2019/0014205 A1* | 1/2019 | Miloseski | H04M 1/72451 |
| 2019/0373058 A1* | 12/2019 | De Almeida Forjaz de Lacerda | H04L 67/1078 |
| 2020/0193161 A1* | 6/2020 | Yoo | G06V 40/28 |

* cited by examiner (a)  (b)

(a)            (b)

APPARATUS AND CONTROL METHOD FOR RECOMMENDING APPLICATIONS BASED ON CONTEXT-AWARENESS

CROSS-REFERENCE TO RELATED APPLICATION

Pursuant to 35 U.S.C. § 119(a), this application claims the benefit of earlier filing date and right of priority to Korean Patent Application No. 10-2019-0108330, filed on Sep. 2, 2019, the contents of which are all hereby incorporated by reference herein in its entirety.

BACKGROUND

1. Technical Field

The present disclosure relates to an apparatus and control method for recommending an application or a function of an application, and more particularly, to an apparatus and control method for recommending an appropriate application or a function of an application based on a recognized situation of an electronic device user.

2. Description of Related Art

In home appliances, cars, etc. in addition to smartphones, environments that can connect to internet and install and use application through network are increasing.

Existing smartphones and other products provide a function that recommends applications to the user, but the prior art mainly recommends applications or functions recently used by a user without considering the user's situation or recommends applications or functions with a high frequency of use.

In addition, the conventional application function recommendation scheme is also presented to the user without any particular distinction between the recommended applications.

Related Art 1 discloses a technique for recommending a recommendation application according to a specific place that can be utilized at a specific place according to the place where the terminal is located but it is simply recommending an application that can be used in a specific place, instead of a user's situation.

In particular, when the proximity between the user location information and the specific place location information presented in Related Art 1 becomes larger than a predetermined value, the method of recommending an application related to the place location information, for example, a department store application located at the place, is a uniform method without considering the time information or traffic information of the user passing through the place, and thus there is a problem of recommending the same application when always approaching the place.

Related Art 2 discloses a method for recommending an application based on a keyword extracted from content displayed on a display area of an electronic device.

Related Art 2 provides a method of determining the display order of the recommended application based on the frequency of use of the application of the user or the number of executions of the application executed together with the application displayed in the display area within a predetermined time range, but this also has a limitation considering only the history executed in the electronic device.

In such a way, when only the history executed in the electronic device is considered instead of the user's situation, it is difficult to recommend an application suitable for the user's situation.

In particular, since Related Art 2 recommends an application based on a text-based keyword in a memo, Social Network Service (SNS), image, etc., there is a problem of recommending an application based on insufficient data.

[Patent Document]

Related Art 1: Korean Unexamined Patent Publication No. 10-2016-0017532 (Published Feb. 16, 2016)
Related Art 2: Korean Unexamined Patent Publication No. 10-2017-0077714 (published Jul. 6, 2017)

SUMMARY OF THE INVENTION

An aspect of the present disclosure is to provide an apparatus control method and an electronic device for recommending an application or a function of an application based on a situation of a user who uses the electronic device.

Another aspect of the present disclosure is to provide a user's convenience by providing a shortcut for a preset application together with a shortcut for an application recommended for a user using the electronic device.

Another aspect of the present disclosure is to provide an apparatus control method and apparatus for recommending an application or a function of an application based on a user's situation without transmitting personal information to a server as the electronic device trains and uses the learning model primarily trained or untrained in the server device.

Another aspect of the present disclosure is to provide an apparatus control method and an electronic device for recommending an application or a function of an application further based on context information collected from devices connected to the electronic device.

Another aspect of the present disclosure is to provide an apparatus control method and apparatus that can display the recommended application or the function of the recommended application on the device connected to the electronic device to use a function of a learning model of an electronic device even in the connected device.

Solution to Problem

An apparatus control method of an electronic device according to an embodiment of the present disclosure provides an electronic device to display a first shortcut related to an application determined based on a result applied to a learning model and a second shortcut associated with a preset application.

Specifically, an apparatus control method of an electronic device according to an embodiment of the present disclosure includes receiving a preset input from a user, in response to the input, applying context information to a machine learning based first learning model, the context information including at least one of environmental information collected through a sensor of the electronic device or a network or usage information generated by the use of the electronic device, and displaying, on a display, a first shortcut related to an application determined on the basis of a result of applying the context information to the first learning model and a second shortcut related to a preset application.

Through the apparatus control method according to the present embodiment, since an application or a function of an application can be recommended based on the user's situation, the user's convenience of using the electronic device may be improved.

In addition, the first learning model may be a learning model trained using training data in which an application or an application function which a user selected is configured as a label under the condition of specific context information.

Through the training method of the learning model according to the present embodiment, an application or a function of an application may be recommended in the learning model based on a user's situation.

In addition, the usage information may include at least one of call list information, message information, schedule information, application usage information, network usage information, or internet usage information.

Through the usage information according to the present embodiment, the learning model may be trained based on information that a user uses the electronic device.

In addition, the method may further include, before the receiving of the input, receiving a second learning model from a first server device, generating and storing context information, and training the second learning model using training data in which an application or an application function which a user selected is configured as a label under the condition of the stored context information to generate the first learning model.

Through a training method of a learning model according to the present embodiment, an application or a function of an application based on a user's situation may be recommended without transmitting personal information to a server.

Furthermore, the method may further include, before the generating of the first learning model, determining whether the electronic device is connected to a power source, determining whether a user uses the electronic device, comparing an estimated amount of time the user is expected not to use the electronic device with an estimated amount of time of generating the first learning model, and determining whether to generate the first learning model based on a result of the comparing of the estimated amount of time.

Through the training method of the learning model according to the present embodiment, it is possible to reliably train the learning model without failure due to power instability.

Moreover, the method may further include, before the generating of the first learning model, transmitting information related to a difference between the first learning model and the second learning model to a second server device.

Through the apparatus control method according to the present embodiment, the learning model can be trained without transmitting personal information to the server device, and the server device also uses the difference in the learning model received from the electronic device to learn the learning model held by the server device.

The method may further include, after the generating of the first learning model, transmitting the first learning model to a second server device and requesting to store the first learning model as associated with the user.

Through the apparatus control method according to the present embodiment, even if the user uses multiple electronic devices or changes the electronic device, it is advantageous in receiving the stored learning model and using the application recommendation function.

Furthermore, the method may further include, after the displaying of the first shortcut and the second shortcut, monitoring a response of the user to the first shortcut, and based on the response corresponds to a preset reference, re-training the first learning model with training data reflecting additional context information generated or stored after the generating of the first learning model.

Through the learning model training method according to the present embodiment, a training model capable of recommending an application or a function of an application according to a user's intention according to the recommendation may be trained.

In addition, the method may further include determining that the electronic device is connected to another device. The receiving of the preset input may include receiving the preset input through a network connected to the another device. The displaying of the first shortcut and the second shortcut may include displaying the first shortcut or the second shortcut associated with a type of the another device on the display of the another device.

Through the apparatus control method according to the present embodiment, the function of the learning model held by the electronic device may be used in the connected device.

In addition, the context information may further include at least one of environmental information collected through a sensor or a network of another device, or usage information generated by the use of the other device. The generating and storing of the context information may include storing at least one of the environmental information or the usage information in association with geographic information or time information.

Through context information data according to the present embodiment, it is possible to recommend an application or a function of an application by reflecting a situation more accurately.

Furthermore, the displaying of the first shortcut and the second shortcut may include displaying, on the display, an arrangement of the plurality of first shortcuts and the plurality of second shortcuts to be disposed in the form of different curves, respectively.

Through the interface according to the present embodiment, the user's ease of use for the recommended application can be improved.

In addition, the method may further include, before the displaying of the first shortcut and the second shortcut, checking an application running on the electronic device. The second shortcut may be a shortcut preset to be associated with the running application.

Through the apparatus control method according to the present embodiment, the usability of the running application can be improved.

An electronic device according to an embodiment of the present disclosure may be configured to apply context information to a first learning model and display a first shortcut related to an application determined based on an application result of the context information to the first learning model and a second shortcut related to a preset application.

Specifically, an electronic device includes a processor, a memory electrically connected to the processor and configured to store at least one instruction performed in the processor or parameters of a machine learning based first learning model, at least one sensor configured to sense physical information, a network, or a display configured to display a user interface. The processor, in response to a preset input received from a user, is configured to apply context information to the first learning model, the context information including at least one of environmental information collected through the sensor the network or usage information generated by the use of the electronic device, and display, on the display, a first shortcut related to an application determined on the basis of an application result of the context information to the first learning model and a second shortcut related to a preset application.

Through the electronic device according to the present embodiment, since an application or a function of an application can be recommended based on the user's situation, the user's convenience of using the electronic device may be improved.

An electronic device according to an embodiment of the present disclosure may be configured to control a connected device to apply context information to a first learning model and display a first shortcut related to an application determined based on an application result of the context information to the first learning model and a second shortcut related to a preset application.

Specifically, an electronic device includes a processor, a memory electrically connected to the processor and configured to store at least one instruction performed in the processor or parameters of a machine learning based first learning model, at least one sensor configured to sense physical information, or a network configured to transmit and receive information. The processor, in response to a preset input received from a user, applies context information to the first learning model, the context information including at least one of environmental information collected through the sensor the network or usage information generated by the use of the electronic device, and displays, on the display, a first shortcut related to an application determined on the basis of an application result of the context information to the first learning model and a second shortcut related to a preset application. When receiving a preset user input from another device through the network, the processor is configured to apply context information to the first learning model, the context information including at least one of environmental information collected through the sensor the network or usage information generated by the use of the electronic device, and display, on the other device, a first shortcut related to an application determined on the basis of an application result of the context information to the first learning model and a second shortcut related to a preset application.

Through the electronic device according to the present embodiment, the function of the learning model held by the electronic device may be used in the connected device.

DETAILED DESCRIPTION

Figure 1:
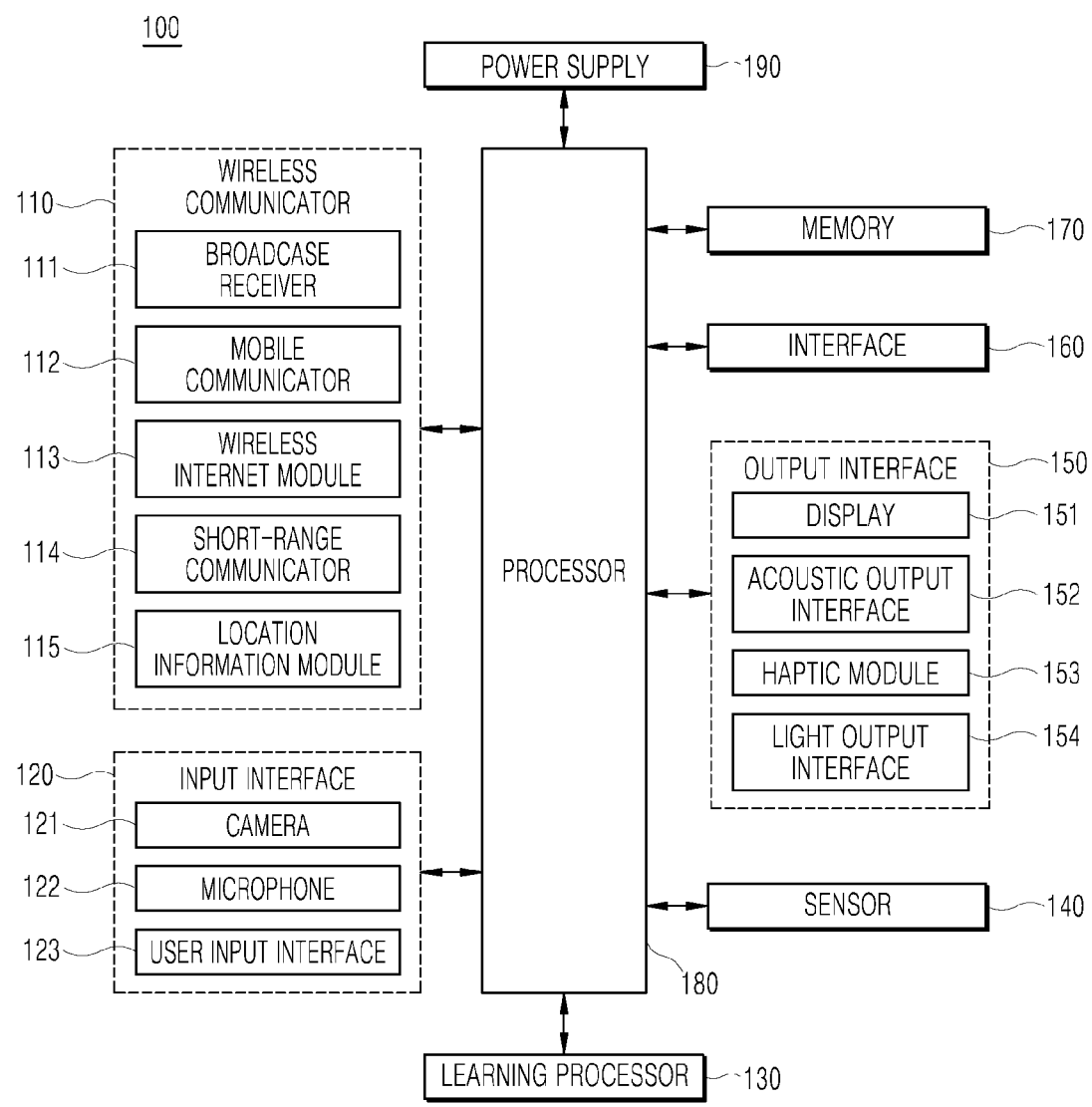
FIG. 1 is a block diagram illustrating the configuration of a terminal 100 according to an embodiment of the present disclosure.

Hereinafter, exemplary embodiments disclosed the present disclosure will be described in detail with reference to the accompanying drawings, and the same or similar components are denoted by the same reference numerals regardless of reference numerals, and repeated description thereof will be omitted. In the following description, the terms "module" and "unit" for referring to elements are assigned and used exchangeably in consideration of convenience of explanation, and thus, the terms per se do not necessarily have different meanings or functions. In addition, in the following description of the embodiments disclosed in this specification, the detailed description of related known technology will be omitted when it may obscure the subject matter of the embodiments according to the present disclosure. Further, the accompanying drawings are provided for more understanding of the embodiment disclosed in the present specification, but the technical spirit disclosed in the present disclosure is not limited by the accompanying drawings. It should be understood that all changes, equivalents, and alternatives included in the spirit and the technical scope of the present disclosure are included.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

The artificial intelligence (AI) is one field of computer science and information technology that studies methods to make computers mimic intelligent human behaviors such as reasoning, learning, self-improving and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, the Machine Learning can be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

The term 'machine learning' can be used interchangeably with the term 'mechanical learning'.

Many Machine Learning algorithms have been developed on how to classify data in the Machine Learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

In this specification, the term 'layer' can be used interchangeably with the term 'level'.

An ANN may be classified as a single-layer neural network or a multi-layer neural network, based on the number of layers therein.

In general, a single-layer neural network may include an input layer and an output layer.

Further, in general, a multi-layer neural network may include an input layer, one or more hidden layers, and an output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

In the meantime, a deep neural network with a plurality of hidden layers between the input layer and the output layer may be the most representative type of artificial neural network which enables deep learning, which is one machine learning technique.

On the other hand, the term 'deep learning' can be used interchangeably with the term 'in-depth learning'.

The Artificial Neural Network can be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

In the meantime, the training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

In this specification, the term 'grouping' can be used interchangeably with the term 'clustering'.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. In SGD, momentum and NAG are techniques that increase the optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

FIG. 1 is a block diagram illustrating the configuration of a terminal 100 according to an embodiment of the present disclosure.

The terminal 100 may be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage.

That is, the equipment 100 may be implemented as various home appliances used at home and also applied to a fixed or mobile robot.

The terminal 100 may perform a function of a voice agent. The voice agent may be a program which recognizes a voice of the user and outputs a response appropriate for the recognized voice of the user as a voice.

Referring to FIG. 1, the terminal 100 may include a wireless communicator 110, an input interface 120, a learning processor 130, a sensing unit 130, an output interface 150, an interface 160, a memory 170, a processor 180, and a power supply 190.

A learning model (a trained model) may be loaded in the equipment 100.

In the meantime, the learning model may be implemented by hardware, software, or a combination of hardware and software. When a part or all of the learning model is implemented by software, one or more commands which configure the learning model may be stored in the memory 170.

The wireless communicator 110 may include at least one of a broadcasting receiving module 111, a mobile communication module 112, a wireless internet module 113, a short-range communication module 114, or a position information module 115.

The broadcasting receiving module 111 receives a broadcasting signal and/or broadcasting related information from an external broadcasting management server through a broadcasting channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless internet module 113 refers to a module for wireless internet access and may be built in or external to the equipment 100. The wireless internet module 113 may be configured to transmit/receive a wireless signal in a communication network according to wireless internet technologies.

The wireless internet technologies may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A).

The short-range communication module 114 may support Short-range communication by using at least one of BluetoothTM, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal, and its representative examples include a global positioning system (GPS) module or a Wi-Fi module. For example, the mobile terminal may obtain its position by using a signal transmitted from a GPS satellite through the GPS module.

The input interface 120 may include a camera 121 which inputs an image signal, a microphone 122 which receives an audio signal, and a user input interface 123 which receives information from the user.

Voice data or image data collected by the input interface 120 is analyzed to be processed as a control command of the user.

The input interface 120 may obtain training data for training a model and input data used to obtain an output using the trained model.

The input interface 120 may obtain input data which is not processed, and, in this case, the processor 180 or the learning processor 130 pre-processes the obtained data to generate training data to be input to the model learning or pre-processed input data.

In this case, the pre-processing on the input data may refer to extracting of an input feature from the input data.

The input interface 120 is for inputting of image information (or signal), audio information (or signal), data, or information being inputted from a user. For example for inputting of the image information, the terminal 100 may be provided with one or more cameras 121.

The camera 121 processes an image frame such as a still image or a moving image obtained by an image sensor in a video call mode or a photographing mode. The processed image frame may be displayed on the display 151 or stored in the memory 170.

The microphone 122 processes an external sound signal as electrical voice data. The processed voice data may be utilized in various forms in accordance with a function which is being performed by the equipment 100 (or an application program which is being executed). In the meantime, in the microphone 122, various noise removal algorithms which remove a noise generated during the process of receiving the external sound signal may be implemented.

The user input interface 123 receives information from the user and when the information is input through the user input interface 123, the processor 180 may control the operation of the equipment 100 so as to correspond to the input information.

The user input interface 123 may include a mechanical input interface (or a mechanical key, for example, a button located on a front, rear, or side surface of the equipment 100, a dome switch, a jog wheel, or a jog switch) and a touch type input interface. For example, the touch type input interface may be composed of a virtual key, a soft key, or a visual key which is disposed on the touch screen through a software process or a touch key which is disposed on a portion other than the touch screen.

The learning processor 130 learns the model configured by an artificial neural network using the training data.

Specifically, the learning processor 130 allows the artificial neural network to repeatedly learn using various learning techniques described above to determine optimized model parameters of the artificial neural network.

In this specification, the artificial neural network which is trained using training data to determine parameters may be referred to as a learning model or a trained model.

In this case, the learning model may be used to deduce a result for the new input data, rather than the training data.

The learning processor 130 may be configured to receive, classify, store, and output information to be used for data mining, data analysis, intelligent decision making, and machine learning algorithm and techniques.

The learning processor 130 may include one or more memory units configured to store data which is received, detected, sensed, generated, previously defined, or output by another component, device, the terminal, or a device which communicates with the terminal.

The learning processor 130 may include a memory which is combined with or implemented in the terminal. In some exemplary embodiments, the learning processor 130 may be implemented using the memory 170.

Selectively or additionally, the learning processor 130 may be implemented using a memory related to the terminal, such as an external memory which is directly coupled to the terminal or a memory maintained in the server which communicates with the terminal.

According to another exemplary embodiment, the learning processor 130 may be implemented using a memory maintained in a cloud computing environment or other remote memory locations accessible by the terminal via a communication method such as a network.

The learning processor 130 may be configured to store data in one or more databases to identify, index, categorize, manipulate, store, search, and output data in order to be used for supervised or non-supervised learning, data mining, predictive analysis, or used in the other machine. Here, the database may be implemented using the memory 170, a memory 230 of the learning device 200, a memory maintained in a cloud computing environment or other remote memory locations accessible by the terminal via a communication method such as a network.

Information stored in the learning processor 130 may be used by the processor 180 or one or more controllers of the terminal using an arbitrary one of different types of data analysis algorithms and machine learning algorithms.

Examples of algorithm include k-nearest neighbor systems, fuzzy logic (for example, likelihood theory), neural networks, Boltzmann machines, vector quantization, pulse neural networks, support vector machines, maximum margin classifiers, hill climbing, induction logic system, Bayesian network, Pertinet (for example, a finite state machine, a millimachine, a Moore finite state machine), a classifier tree (for example, a perceptron tree, a support vector tree, a Markov tree, a decision tree forest, an arbitrary forest), decoding models and systems, artificial fusion, sensor fusion, image fusion, reinforcement learning, augmented reality, pattern recognition, an automated plan, and so forth.

The processor 180 may determine or predict at least one executable operation of the terminal based on information which is determined or generated using the data analysis and the machine learning algorithm. To this end, the processor 180 may request, search, receive, or utilize the data of the learning processor 130 and control the terminal to execute a predicted operation or a desired operation among the at least one executable operation.

The processor 180 may perform various functions which implement intelligent emulation (that is, a knowledge based system, an inference system, and a knowledge acquisition system). This may be applied to various types of systems (for example, a fuzzy logic system) including an adaptive system, a machine learning system, and an artificial neural network.

The processor 180 may include sub modules which enable operations involving voice and natural language voice processing, such as an I/O processing module, an environmental condition module, a speech to text (STT) processing module, a natural language processing module, a workflow processing module, and a service processing module.

The sub modules may have an access to one or more systems or data and a model, or a subset or a super set thoseof in the terminal. Further, each of the sub modules may provide various functions including a glossarial index, user data, a workflow model, a service model, and an automatic speech recognition (ASR) system.

According to another exemplary embodiment, another aspect of the processor 180 or the terminal may be implemented by the above-described sub module, a system, data, and a model.

In some exemplary embodiments, based on the data of the learning processor 130, the processor 180 may be configured to detect and sense requirements based on contextual conditions expressed by user input or natural language input or user's intention.

The processor 180 may actively derive and obtain information required to completely determine the requirement based on the contextual conditions or the user's intention. For example, the processor 180 may actively derive information required to determine the requirements, by analyzing past data including historical input and output, pattern matching, unambiguous words, and input intention.

The processor 180 may determine a task flow to execute a function responsive to the requirements based on the contextual condition or the user's intention.

The processor 180 may be configured to collect, sense, extract, detect and/or receive a signal or data which is used for data analysis and a machine learning task through one or more sensing components in the terminal, to collect information for processing and storing in the learning processor 130.

The information collection may include sensing information by a sensor, extracting of information stored in the memory 170, or receiving information from other equipment, an entity, or an external storage device through a communicator.

The processor 180 collects usage history information from the terminal and stores the information in the memory 170.

The processor 180 may determine best matching to execute a specific function using stored usage history information and predictive modeling.

The processor 180 may receive or sense surrounding environmental information or other information through the sensing unit 140.

The processor 180 may receive a broadcasting signal and/or broadcasting related information, a wireless signal, or wireless data through the wireless communicator 110.

The processor 180 may receive image information (or a corresponding signal), audio information (or a corresponding signal), data, or user input information from the input interface 120.

The processor 180 may collect the information in real time, process or classify the information (for example, a knowledge graph, a command policy, a personalized database, or a conversation engine) and store the processed information in the memory 170 or the learning processor 130.

When the operation of the terminal is determined based on data analysis and a machine learning algorithm and technology, the processor 180 may control the components of the terminal to execute the determined operation. Further, the processor 180 may control the equipment in accordance with the control command to perform the determined operation.

When a specific operation is performed, the processor 180 analyzes history information indicating execution of the specific operation through the data analysis and the machine learning algorithm and technology and updates the information which is previously learned based on the analyzed information.

Therefore, the processor 180 may improve precision of a future performance of the data analysis and the machine learning algorithm and technology based on the updated information, together with the learning processor 130.

The sensing unit 140 may include one or more sensors which sense at least one of information in the mobile terminal, surrounding environmental information around the mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environment sensor (for example, a barometer, a hygrometer, a thermometer, a radiation sensor, a thermal sensor, or a gas sensor), or a chemical sensor (for example, an electronic nose, a healthcare sensor, or a biometric sensor). On the other hand, the terminal 100 disclosed in the present disclosure may combine various kinds of information sensed by at least two of the above-mentioned sensors and may use the combined information.

The output interface 150 generates outputs related to vision, auditory, or tactile and may include at least one of a display 151, a sound output interface 152, a haptic module 153, or an optical output interface 154.

The display 151 displays (outputs) information processed in the equipment 100. For example, the display 151 may display execution screen information of an application program driven in the equipment 100 and user interface (UI) and graphic user interface (GUI) information in accordance with the execution screen information.

The display 151 may form a mutual layer structure with the touch sensor or may be formed integral with the touch sensor, thus being capable of implementing a touch screen. The touch screen may simultaneously serve as a user input interface 123 which provides an input interface between the equipment 100 and the user and provide an output interface between the equipment 100 and the user.

The sound output interface 152 may output audio data received from the wireless communicator 110 or stored in the memory 170 in a call signal reception mode, a phone-call mode, a recording mode, a voice recognition mode, or a broadcasting reception mode.

The sound output interface 152 may include at least one of a receiver, a speaker, or a buzzer.

The haptic module 153 may generate various tactile effects that the user may feel. A representative example of the tactile effect generated by the haptic module 153 may be vibration.

The optical output interface 154 outputs a signal for notifying occurrence of an event using light of a light source of the equipment 100. Examples of the event generated in the equipment 100 may be message reception, call signal reception, missed call, alarm, schedule notification, email reception, and information reception through an application.

The interface 160 serves as a passage with various types of external devices which are connected to the equipment 100. The interface 160 may include at least one of a wired/wireless headset port, an external charger port, a wired/wireless data port, a memory card port, a port which connects a device equipped with an identification module, an audio input/output (I/O) port, a video input/output (I/O) port, or an earphone port. The equipment 100 may perform appropriate control related to the connected external device in accordance with the connection of the external device to the interface 160.

In the meantime, the identification module is a chip in which various information for authenticating a usage right of the equipment 100 is stored and includes a user identification module (UIM), a subscriber identify module (SIM), and a universal subscriber identity module (USIM). The device with an identification module (hereinafter, "identification device") may be manufactured as a smart card. Therefore, the identification device may be connected to the equipment 100 through the interface 160.

The memory 170 stores data which supports various functions of the equipment 100.

The memory 170 may store various application programs (or applications) driven in the equipment 100, data for the operation of the equipment 100, commands, and data (for example, at least one algorithm information for machine learning) for the operation of the learning processor 130.

The memory 170 may store the model which is learned in the learning processor 130 or the learning device 200.

If necessary, the memory 170 may store the trained model by dividing the model into a plurality of versions depending on a training timing or a training progress.

In this case, the memory 170 may store input data obtained from the input interface 120, learning data (or training data) used for model learning, a learning history of the model, and so forth.

In this case, the input data stored in the memory 170 may be not only data which is processed to be suitable for the model learning but also input data itself which is not processed.

In addition to the operation related to the application program, the processor 180 may generally control an overall operation of the equipment 100. The processor 180 may process a signal, data, or information which is input or output through the above-described components or drives the application programs stored in the memory 170 to provide or process appropriate information or functions to the user.

Further, in order to drive the application program stored in the memory 170, the processor 180 may control at least some of components described with reference to FIG. 1. Moreover, the processor 180 may combine and operate at least two of components included in the equipment 100 to drive the application program.

In the meantime, as described above, the processor 180 may control an operation related to the application program and an overall operation of the equipment 100. For example, when the state of the terminal satisfies a predetermined condition, the processor 180 may execute or release a locking state which restricts an input of a control command of a user for the applications.

The power supply 190 is applied with external power or internal power to supply the power to the components included in the equipment 100 under the control of the processor 180. The power supply 190 includes a battery and the battery may be an embedded battery or a replaceable battery.

Figure 2:
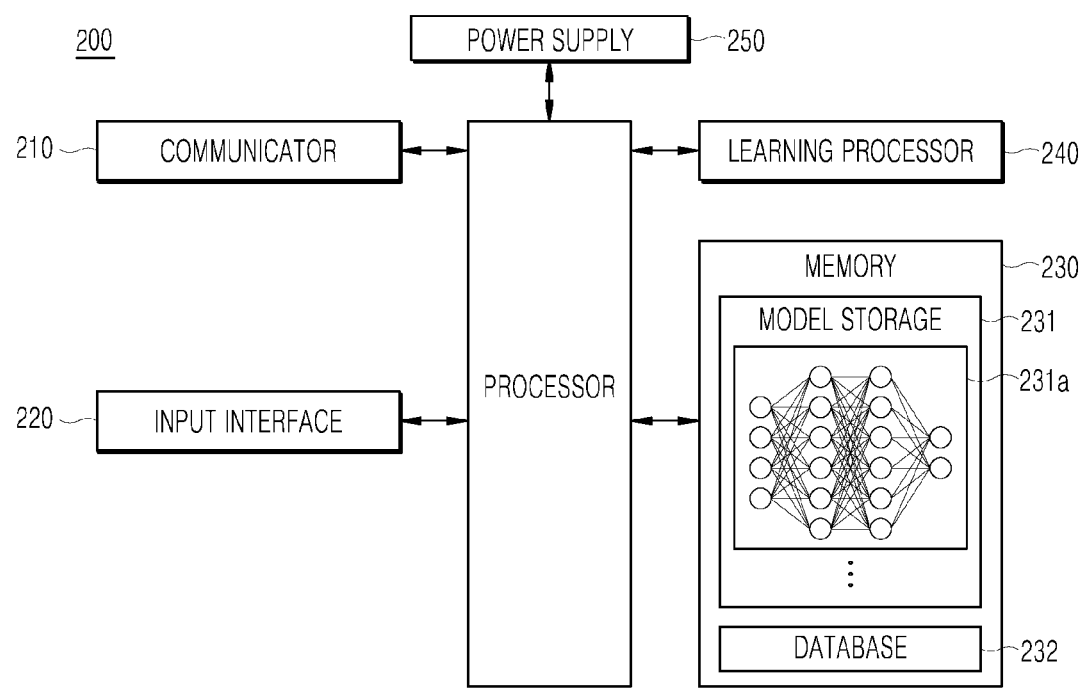
FIG. 2 is a block diagram illustrating a configuration of a learning device 200 for an artificial neural network according to an embodiment of the present disclosure.

FIG. 2 is a block diagram illustrating a configuration of a learning device 200 for an artificial neural network according to an embodiment of the present disclosure.

The learning device 200 is a device or a server which is separately configured at the outside of the equipment 100 and may perform the same function as the learning processor 130 of the equipment 100.

That is, the learning device 200 may be configured to receive, classify, store, and output information to be used for data mining, data analysis, intelligent decision making, and machine learning algorithms Here, the machine learning algorithm may include a deep learning algorithm.

The learning device 200 may communicate with at least one equipment 100 and derive a result by analyzing or learning the data on behalf of the equipment 100. Here, the meaning of "on behalf of the other device" may be distribution of a computing power by means of distributed processing.

The learning device 200 of the artificial neural network is various devices for learning an artificial neural network and normally, refers to a server, and also referred to as a learning device or a learning server.

Specifically, the learning device 200 may be implemented not only by a single server, but also by a plurality of server sets, a cloud server, or a combination thereof.

That is, the learning device 200 is configured as a plurality of learning devices to configure a learning device set (or a cloud server) and at least one learning device 200 included in the learning device set may derive a result by analyzing or learning the data through the distributed processing.

The learning device 200 may transmit a model trained by the machine learning or the deep learning to the equipment 100 periodically or upon the request.

Referring to FIG. 2, the learning device 200 may include a communicator 210, an input interface 220, a memory 230, a learning processor 240, a power supply 250, a processor 260, and so forth.

The communicator 210 may correspond to a configuration including the wireless communicator 110 and the interface 160 of FIG. 1. That is, the communicator may transmit and receive data with the other device through wired/wireless communication or an interface.

The input interface 220 is a configuration corresponding to the input interface 120 of FIG. 1 and may receive the data through the communicator 210 to obtain data.

The input interface 220 may obtain input data for acquiring an output using training data for model learning and a trained model.

The input interface 220 may obtain input data which is not processed, and, in this case, the processor 260 may pre-process the obtained data to generate training data to be input to the model learning or pre-processed input data.

In this case, the pre-processing on the input data performed by the input interface 220 may refer to extracting of an input feature from the input data.

The memory 230 is a configuration corresponding to the memory 170 of FIG. 1.

The memory 230 may include a model storage 231, a database 232, and so forth.

The model storage 231 stores a model (or an artificial neural network 231a) which is learning or trained through the learning processor 240 and when the model is updated through the learning, stores the updated model.

If necessary, the model storage 231 stores the trained model by dividing the model into a plurality of versions depending on a training timing or a training progress.

The artificial neural network 231a illustrated in FIG. 2 is one example of artificial neural networks including a plurality of hidden layers but the artificial neural network of the present disclosure is not limited thereto.

The artificial neural network 231a may be implemented by hardware, software, or a combination of hardware and software. When a part or all of the artificial neural network 231a is implemented by the software, one or more commands which configure the artificial neural network 231a may be stored in the memory 230.

The database 232 stores input data obtained from the input interface 220, learning data (or training data) used to learn a model, a learning history of the model, and so forth.

The input data stored in the database 232 may be not only data which is processed to be suitable for the model learning but also input data itself which is not processed.

The learning processor 240 is a configuration corresponding to the learning processor 130 of FIG. 1.

The learning processor 240 may train (or learn) the artificial neural network 231a using training data or a training set.

The learning processor 240 may immediately obtain data which is obtained by pre-processing input data obtained by the processor 260 through the input interface 220 to learn the artificial neural network 231a or obtain the pre-processed input data stored in the database 232 to learn the artificial neural network 231a.

Specifically, the learning processor 240 repeatedly may train the artificial neural network 231a using various learning techniques described above to determine optimized model parameters of the artificial neural network 231a.

In this specification, the artificial neural network which is trained using training data to determine parameters may be referred to as a learning model or a trained model.

Here, the trained model may infer result values even while being installed in a learning device 200 of an artificial neural net and may be transferred to and installed in another device such as a euipment 100 by a communicator 210.

Further, when the trained model is updated, the updated trained model may be transferred to and installed in another device such as the equipments 100 through the communicator 210.

The power supply 250 is a configuration corresponding to the power supply 190 of FIG. 1.

A redundant description for corresponding configurations will be omitted.

Figure 3:
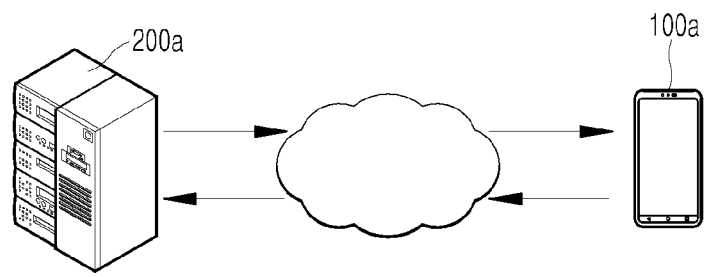
FIGS. 3 and 4 are exemplary diagrams of an environment capable of implementing an application or application function recommendation method of an electronic device.

FIG. 3 is an exemplary diagram of an environment in which an application or application function recommendation method of the electronic device 100a according to an embodiment of the present disclosure can be implemented. In the following description, description of parts that are the same as those in FIG. 1 to FIG. 2 will be omitted.

Referring to FIG. 3, an environment for implementing an application or application function recommendation method of the electronic device 100a according to an embodiment may include an electronic device 100a, a server device 200a capable of training a learning model based on machine learning, and a network connecting them each other.

The electronic device 100a may include a configuration as shown in FIG. 1, and may be a mobile device that can be moved while held by a user, and may be any one of a variety of devices, for example a smartphone, a tablet PC, a smart watch, a notebook, a PDA, and the like.

The electronic device 100a may transmit and receive information to and from the Internet through a mobile communication network such as CDMA, GSM, WCDMA, LTE, 5 generation mobile communication (5G) in addition to Wi-Fi.

The electronic device 100a may provide an environment in which applications may be installed and executed through a Graphical User Interface (UI) in various operating system (OS) environments.

The electronic device 100a may store, as usage information, data generated from using an application installed in the user's electronic device 100a or executing an internal process of the electronic device 100a without user's interference, and this will be described below.

The electronic device 100a may include various sensor modules such as a position sensor such as a GPS, a gyroscope sensor, a motion sensor, an acceleration sensor, an RGB sensor, an infrared sensor, an environmental sensor (temperature sensor, humidity sensor, etc.), a magnetic sensor, a touch sensor, a proximity sensor, an illuminance sensor, and a depth sensor, and may sense environmental information of the electronic device 100a through sensors or a network.

The electronic device 100a may store data generated from sensors mounted on the electronic device 100a or data collected through a network as environmental information. This will be described in detail below.

If the input received from the user is a preset input that activates the application recommendation, the electronic device 100a may input context information at the time of receiving the input into a learning model based on machine learning, and recommend the application or the function of the application to the user based on the output result of the learning model.

A method of recommending an application or a function of an application to a user by the electronic device 100a based on a preset input for enabling application recommendation and the output result of the learning model will be described in detail below.

The server device 200a may include a configuration as shown in FIG. 2. In one embodiment, under the condition of various context information, by using training data labeled with information that a plurality of users or a specific user performs an application or a function of an application, the server device 200a may train the learning model to recommend an application or an application function according to the context information.

In one embodiment, based on the result of applying the context information to the learning model received from the server device 200a, the electronic device 100a may recommend an application or a function of the application to the user.

In another embodiment, the electronic device 100a may apply the context information after training the learning model again received from the server device 200a by using the training data labeled with information of an application or an application executed by a user of the electronic device 100a under various context information.

In another embodiment, using training data that labels an application or information of an application executed by a plurality of users or a specific user under various context information with a user's situation, the server device 200a may train the learning model to determine the user's situation according to the context information. Therefore, a result of applying the context information to the corresponding learning model by the electronic devices 100a and 100b may be a determination for the user's situation, for example, 'working', 'resting at home', 'spending time with a friend outside', or the like, and the electronic device 100a or 100b may recommend an application or a function of an application related to the corresponding situation to the user based on the determined situation.

In another embodiment, based on the situation determined by applying the context information to the learning model received from the server device 200a, the electronic device 100a may recommend an application or a function of the application to the user.

Figure 4:
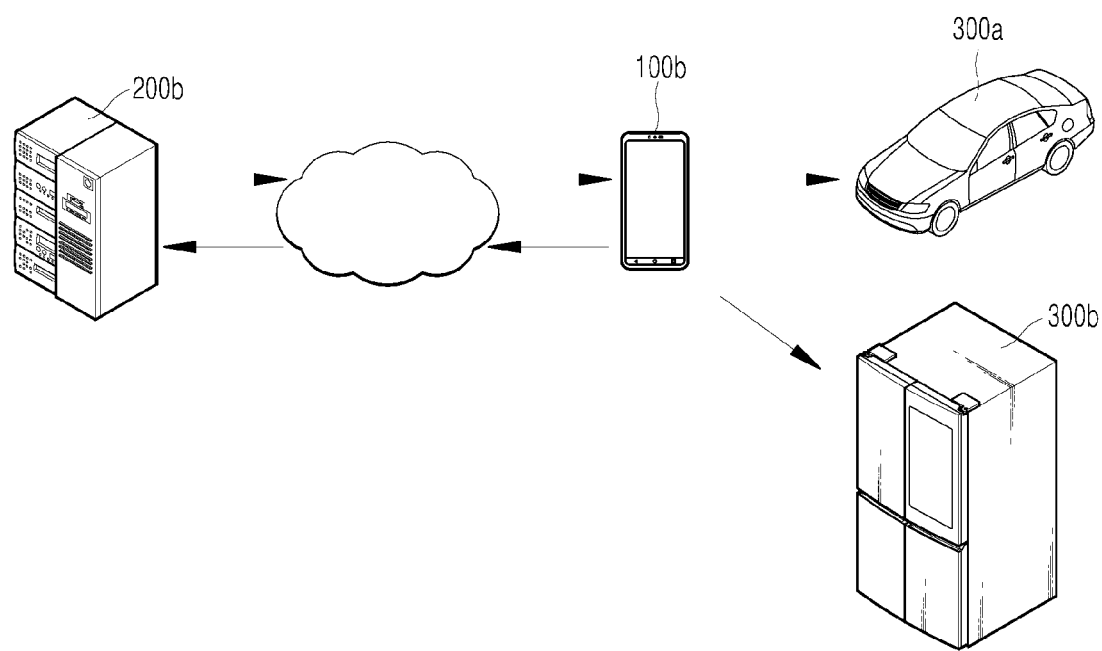

FIG. 4 is an exemplary diagram of an environment in which an application or application function recommendation method of the electronic device 100b according to another embodiment of the present disclosure can be implemented. In the following description, the description of the parts overlapping with those of FIGS. 1 to 3 will be omitted.

Referring to FIG. 4, an environment for implementing an application or an application function recommendation method of the electronic device 100b according to an embodiment of the present disclosure may include an electronic device 100b, a server device (200b) capable of training a machine learning-based learning model, a network that connects them to each other, and connection devices 300a and 300b that are connected to the electronic device 100b through wired/wireless communication so that the electronic device 100b may request or control the connection devices 300a and 300b to display an application or an application function recommended by the electronic device 100b.

The connection devices 300a and 300b may be connected to the electronic device 100b through wired or wireless communication. For example, a communication connection between the user terminal 100b and the connection devices 300a and 300b may be established through Bluetooth, Zigbee, Wi-Di, and Zing as wireless communication. A communication connection between the user terminal 100b and the connection devices 300a and 300b may be established through a connection such as USB, FireWire (IEEE 1394), or the like as wired communication.

The connection devices 300a and 300b may be connected to the electronic device 100b through a specific interface method. For example, when the connection device 300a is a vehicle, through interfaces like Android Auto, Apple CarPlay, Mirrorlink, etc., the user terminal 100b and the connection devices 300a and 300b may be connected. When the connection device 300b is a smart home appliance, through interfaces such as mirror link and WiDi, the user terminal 100b and the connection devices 300a and 300b may be connected.

According to an embodiment, the electronic device 100a may receive a user's input for operating the application recommendation function through the connection devices 300a and 300b. For example, when a preset input is received from a user on the display of the vehicle 300a connected to the electronic device 100b with Android Auto, the electronic device 100b may transmit the input to the electronic device 100b.

In one embodiment, based on the result of applying the context information to the learning model, the electronic device 100a may control the connection devices 300a and 300b to recommend an application or a function of the application to the user.

In another embodiment, based on the context determined by applying context information to the learning model, the electronic device 100a may control or request the connection device 300a or 300b to recommend the application or a function of the application to the user through the display of the connection device 300a or 300b.

Figure 5:
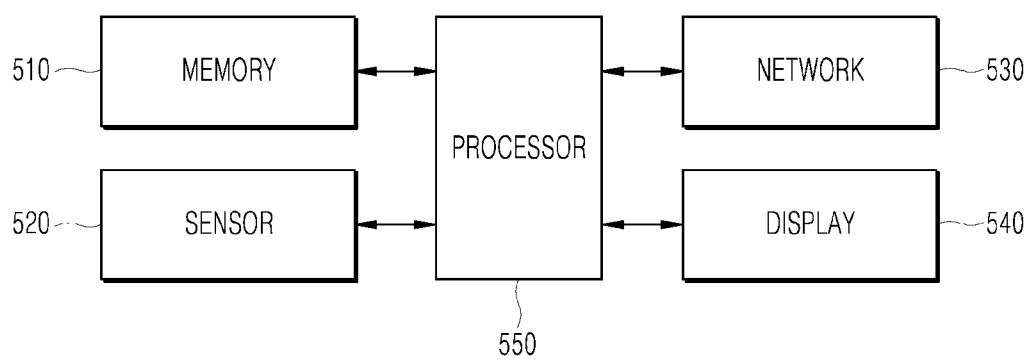
FIG. 5 is a block diagram illustrating a configuration of an electronic device according to an embodiment of the present disclosure.

FIG. 5 illustrates a configuration of an autonomous vehicle 100b according to an embodiment of the present disclosure in which the terminal 100 as shown in FIG. 1 is implemented as the electronic devices 100a and 100b of FIG. 3 or 4. In the following description, the description of parts that are the same as those in FIG. 1 to FIG. 4 will be omitted.

The electronic device 100a or 100b according to an embodiment of the present disclosure is electrically connected to the processor 550, and may include a memory 510 capable of storing instructions performed on the processor 550 or intermediate or final data of processes performed on the processor 550.

The electronic device 100a or 100b according to an embodiment of the present disclosure includes a sensor 520 composed of various sensors capable of sensing physical information, such as a location sensor capable of receiving location information from a GPS satellite, and a processor 550 that can control their operations.

The sensor 520 may detect physical information and store it as environmental information. For example, the information may include the time at which the application or function of the application is executed, the place where the application or function of the application is executed, the temperature or humidity when the application or the function of the application is executed, the illuminance when the application or the function of the application is executed, the movement speed or acceleration when the application or the function of the application is executed, and the like. Information collected through the sensor is not particularly limited.

The processor 550 may store information related to the physical information collected through the network 530 as environmental information or apply the information to the learning model. For example, even if not sensed by the sensor, the information may include at least one of the time when the application or the function of the application is executed, the current weather/expected weather of the region in which the application or the function of the application is executed, or the personality/type/name of the place corresponding to the GPS coordinates where the application is executed. The information related to the physical information collected through the network is not particularly limited.

In another embodiment, the processor 550 may receive data collected from a sensor or a network of another device (not shown) outside the electronic device 100a through the network 530, and store the data as environmental information or apply the data to a learning model. For example, the processor 550 may receive sensing information indicating that food needs to be cooked in an oven from a home oven (not shown), information collected through the network of set-top boxes that new content for the series of interest is published, and notification information from a home server (not shown) that the water in the bathtub reaches the desired temperature through the network 530, and store the information as environmental information or apply the information to a learning model.

The processor 550 may store data generated from internal process execution of the electronic device 100a as usage information or apply the data to the learning model. For example, the usage information may include at least one of call list information including call number, call duration, or call destination information, message information including the destination of the message transmitted or received, message content information, and the like, schedule information stored in the calendar application or contained in mails, messages, etc. received by the user, application usage information including the application's classification in the application market, the execution time of the application, the usage time, and the functions used by the application, application usage information currently running, network usage information including a Wi-Fi providing hub, mobile communication network base station, etc. to which the electronic device 100a is connected, or Internet usage information including Internet addresses accessed by users or applications. The information is not particularly limited as long as the information can be generated from the use of an application or internal process execution of the electronic device 100a without user's interference.

In another embodiment, the processor 550 may receive data generated from internal process execution due to the use of another device (not shown) outside the electronic device 100a through the network 530 and store the data as environmental information or apply the data to a learning model. For example, the processor 550 may receive management information that an expiration date for a specific material in the refrigerator 300b is imminent, management information that the service life of a particular part of a washing machine (not shown) is imminent, and notifications about new recipes downloaded to the oven (not shown) through the network 530, and store the information as environmental information or apply the information to the learning model.

The processor 550 may apply at least one of the environmental information or the usage information to the learning model when receiving a preset input for operating the application recommendation from the user.

Preset inputs to trigger application recommendations may be enabled in various forms, and for example, may include a touch type such as long key touch that keeps the display touched for a certain time and a sliding touch from the feature edge portion of the display into the display, and may be various ways such as a type of continuously pressing external buttons of the electronic devices 100a and 100b in a certain number of times and a voice input type.

The processor 550 may determine an application or application function for recommending to the user based on the result of applying at least one of the above-mentioned environmental information or usage information to the learning model, and the electronic devices 100a and 100b may recommend an application or an application function suitable for a user's situation. In addition, since even the same user may change the environmental information every time the application recommendation is activated, even if the time, timing, or location of enabling the application recommendation function changes, an application or application function that is appropriate for the situation may be recommended.

Different situations of the same user or different situations of different users will be described with reference to FIGS. 6 and 7.

Figure 6:
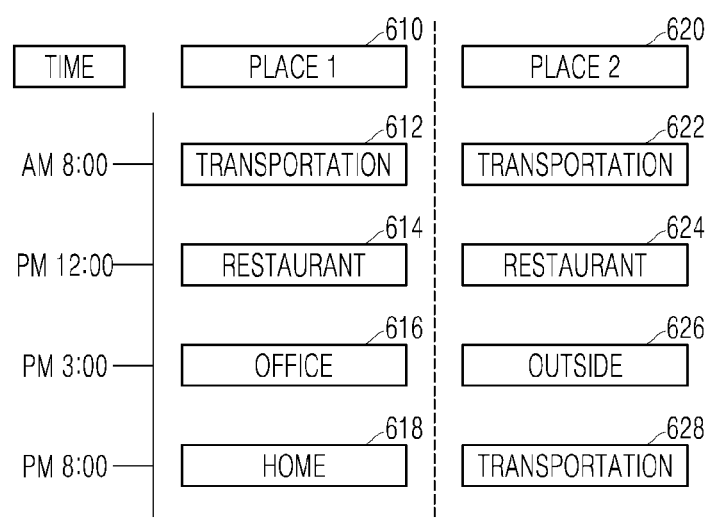
FIGS. 6 and 7 illustrate various situations.

Referring to FIG. 6, a recommended application or a function of an application may be different according to a time and a place change of activating an application recommendation function of the same user.

For example, a learning model may be trained with environmental information and usage information that mainly execute a reading application while a user commutes to a workplace located in the same place by subway. In this case, after the usage information of boarding 612 the subway at a certain range of time from 8:00 a.m., which is the user's commute time, is stored, when receiving input for activating the application recommendation function from the user, the electronic devices 100a and 100b may recommend a reading application to the user based on a result of recommending the reading application from the learning model to which the environmental information and the usage information are applied.

For another example, even if the same user boards 622 the bus at a certain time from 8:00 a.m. and after usage information, which is workplace information storing the movement direction of a bus or information on a path different from a commuting path each morning, is stored, when receiving input from the user to activate the application recommendation function, the electronic devices 100a and 100b may recommend the traffic information application to the user based on a result of recommending the traffic information application from the learning model to which the environmental information and the usage information are applied.

In the same manner, when the context information 610 different from the context information 620 that is repeatedly recorded every day is inputted to the learning model, the results of the learning model and the recommended application may vary.

Figure 7:
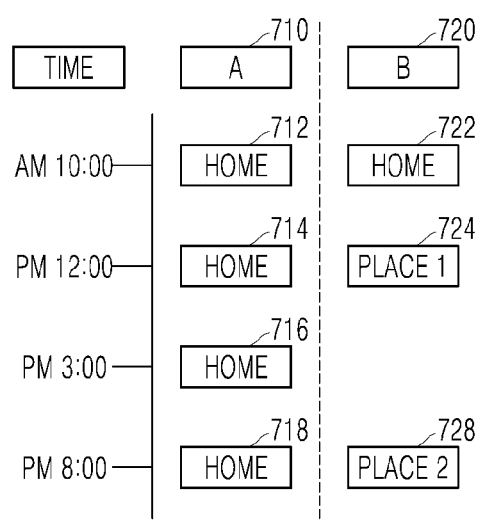

Referring to FIG. 7, recommended applications or functions of applications may be different according to different users.

For example, the learning model may be trained with environmental information and usage information in which user A 710 executes a content application, an internet browser application, and a reading application mainly at home. In this case, when receiving an input for activating the application recommendation function from the user located at home at a certain range of time from 10 am 712, which is the user's wake-up time, the electronic devices 100a and 100b may recommend a reading application to the user based on a result of recommending the reading application from the learning model to which the environmental information and the usage information are applied. In addition, when receiving an input for enabling the application recommendation function from the user at home at a range of time from 12 p.m. 714, a food delivery application, a content application, etc. may be recommended to the user 716 located at home at a range of time from 3 p.m.

For another example, the learning model can be trained with environmental and usage information executed while user B 720 mainly meets friends on the weekends. In this case, when receiving an input for activating the application recommendation function from the user who stores environmental information on leaving the home at a certain range of time from 10 a.m.722, which is the user's waking time, the electronic devices 100a and 100b may recommend a traffic information application to the user based on a result of recommending the traffic information application from the learning model to which the environmental information and the usage information are applied. In addition, when receiving an input for activating an application recommendation function from a user outdoors at a range of time from 12 p.m. 724, it is possible to recommend a restaurant recommendation application.

Figure 8:
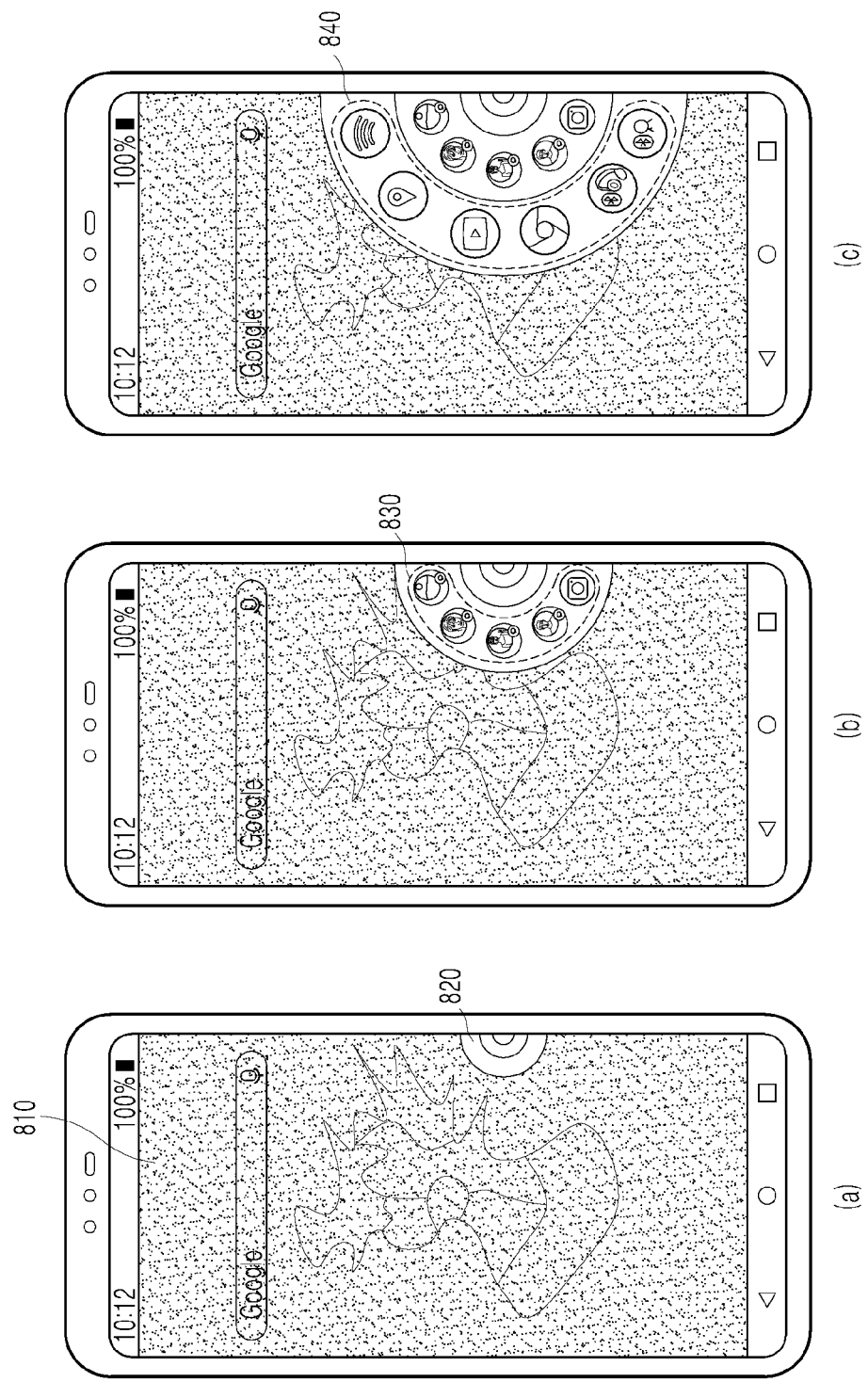
FIGS. 8 to 12 are diagrams illustrating an interface and a recommended application through which an electronic device recommends an application or an application function to a user.
Figure 9:
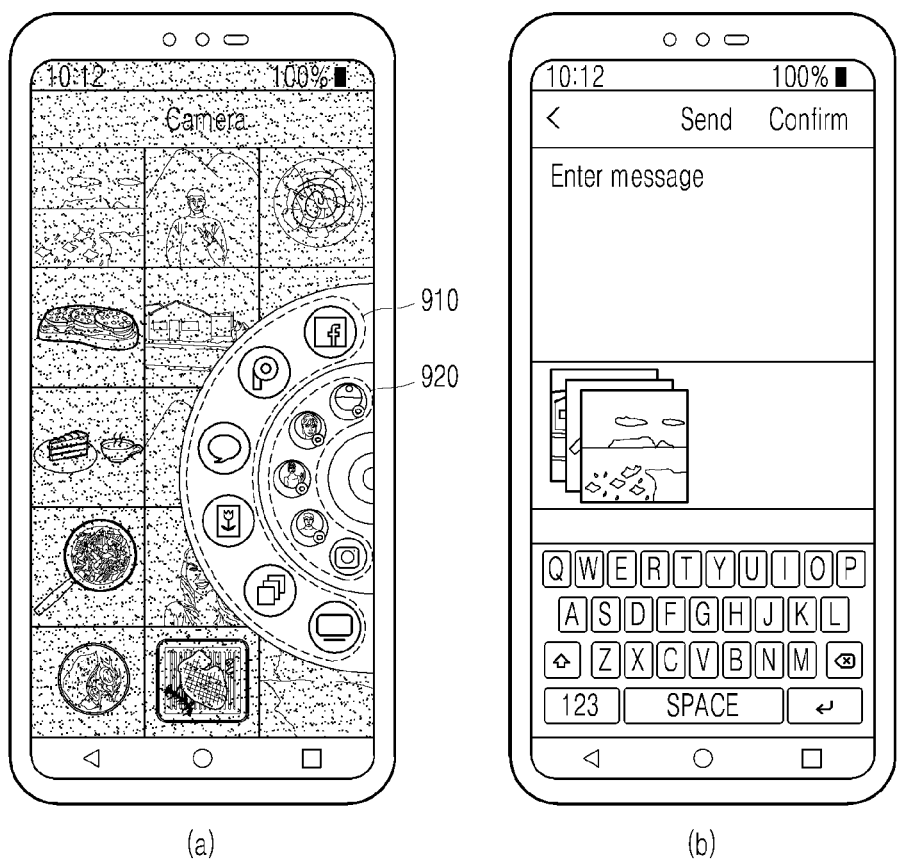

Referring to FIG. 8, an interface through which the electronic devices 100a and 100b recommend an application or an application function to a user will be described.

Referring to FIG. 8, the processor 550 may display, on the display 540, a first shortcut 840 associated with the application determined based on the result of applying the context information to the learning model and a second shortcut 830 associated with the preset application.

The user may activate the application recommendation function by a sliding touch to the left from the right edge 820 of the display 540 or a long key touch on the background portion 810 of the home screen.

In one embodiment, the processor 550 first may display a second shortcut 830 associated with the preset application according to the sliding touch degree of the user, and then display on the display 540 a plurality of first shortcuts 840 associated with the application determined based on the result of applying the context information to the learning model.

The preset application may be preset by the user in the environment settings of the electronic devices 100a and 100b. In one embodiment, whenever the application recommendation function is activated and the result is displayed, regardless of the recommendation result or context information of the learning model, preset shortcuts to the same application or function of the application may be displayed.

Referring to FIG. 8, in one embodiment, the processor 550 may display, on the display 540, the plurality of first shortcuts 840 and the plurality of second shortcuts 830 in a circular form having a different curvature or a semicircular form having a different radius or different positions from a specific point of the display 540. Therefore, the user can intuitively recognize the shortcut of the preset application and the shortcut of the application recommended by the electronic devices 100a and 100b.

In one embodiment, when the number of the first shortcut 840 and the second shortcut 830 is large, the display 540 may display only some of them and display the remaining shortcuts when the user rotates the displayed area by touch.

Referring to FIGS. 9 to 12, when the electronic device 100a or 100b receives an input for enabling the application recommendation function from the user while the user uses the specific application, a learning model and an interface that the electronic device 100a or 100b recommends an application or an application function to a user will be described.

Referring to FIG. 9A, a user may activate an application recommendation function while executing a gallery application.

In one embodiment, the learning model may be trained using environmental information and usage information that a user selects a picture, uploads it to an SNS, sends it to friends, and edits the selected picture through a gallery application. In this case, when a user enables the application recommendation function while the gallery application is running, usage information currently running the Gallery application is inputted into the learning model, and as a result, as shown in FIG. 9A, a plurality of first shortcuts for the SNS application, the photo editing application, and the like may be displayed on the display 540. When the user activates the application recommendation function while selecting a few pictures and selects the message sending application from the first shortcut on the displayed screen, as shown in FIG. 9B, the selected pictures may be automatically included in the message.

The application recommendation result of the learning model may vary depending on the context information of each user used for training the learning model. However, when the application recommendation function is activated while using the gallery application, recently used editing applications, applications connected to the TV, the function to select recently created items, and the like may be recommended.

Referring to FIG. 9A, a user may activate an application recommendation function while executing a gallery application.

In one embodiment, the learning model may be trained using environmental information and usage information that a user selects a picture, uploads it to an SNS, sends it to friends, and edits the selected picture through a gallery application. In this case, when a user enables the application recommendation function while the gallery application is running, usage information currently running the Gallery application is inputted into the learning model, and as a result, as shown in FIG. 9A, a plurality of first shortcuts 910 for the SNS application, the photo editing application, and the like and the second shortcut 920 for preset applications may be displayed on the display 540. When the user activates the application recommendation function while selecting a few pictures and selects the message sending application from the first shortcut on the displayed screen, as shown in FIG. 9B, the selected pictures may be automatically included in the message.

The application recommendation result of the learning model may vary depending on the context information of each user used for training the learning model. However, when the application recommendation function is activated while using the gallery application, recently used editing applications, applications connected to the TV, the function to select recently created items, and the like may be recommended.

Referring to FIG. 10A, a user may activate an application recommendation function while executing an internet browser application.

In one embodiment, the learning model may be trained using environmental information and usage information that a user searches for restaurant information or books a restaurant through internet browser application. In this case, if a user enables the application recommendation function while running an Internet browser application, the usage information currently running on the Internet browser application and the content usage information displayed in the browser application are inputted into the learning model and as a result, as shown in FIG. 10A, a plurality of first shortcuts 1010 for a call application for reservation, a map application for location confirmation, and a second shortcut 1020 for preset applications are displayed on the display 540. When the user selects the map application 1030 in the first shortcut of the displayed screen, the place corresponding to the address information included in the content usage information displayed in the browser application may be displayed in the map application. When there are a plurality of places corresponding to the address information included in the content usage information displayed in the browser application, as shown in FIG. 10B, a shortcut capable of executing a map application may be displayed together with the image search result 1040 of the engine of the server devices 200a and 200b corresponding to the corresponding address.

According to the context information for each user used to train the learning model and the content usage information displayed in the Internet browser application, application recommendation results of learning models can vary. However, for example, when the application recommendation function is activated while using the Internet browser application, call application to call the phone number included in the content, screen capture application, navigation application for moving to the address contained in the content, internet shopping mall applications related to product reviews included in the content, mobile simple payment application when the Internet access information is a shopping mall address, film show information (near theater, show timetable) application related to the movie reviews included in the content, and the like may be recommended. When the user selects the recommended application, some information included in the content may be delivered to the selected application.

Referring to FIG. 11A, a user may activate an application recommendation function while executing a camera application.

In one embodiment, learning models can be trained with environmental information and usage information that the user executes a function to change the applied filter, executes a zoom in or zoom out function, or executes voice control while taking a picture through a camera application. In this case, when a user enables the application recommendation function while the camera application is running, usage information currently running the camera application is inputted into the learning model, and as a result, as shown in FIG. 11A, a plurality of first shortcuts 1110 for a filter change function, a voice control function, and the like, and a second shortcut 1120 for preset applications may be displayed on the display 540. When the user selects the voice control function 1130 in the first shortcut of the displayed screen and a voice is inputted to "shoot in wide angle", as shown in FIG. 11B, the camera photographing range may be changed.

The application recommendation result of the learning model may vary depending on the context information of each user used for training the learning model. However, when the application recommendation function is activated while using the camera application, a picture mode change function, a filter change function, a voice control function, a live streaming function of an SNS application, a TV connection application, and the like may be recommended.

Referring to FIG. 12A, a user may activate an application recommendation function while executing a call application.

In one embodiment, learning models can be trained with environmental information and usage information that the user can run the voice memo function, run the calendar application, or run the Internet browser application during the phone call through the call application. In this case, when a user enables the application recommendation function while the call application is running, usage information currently running the call application is inputted into the learning model, and as a result, as shown in FIG. 11A, a plurality of first shortcuts 1210 for the voice memo function, the schedule management application, and the like and the second shortcuts 1220 for the preset applications may be displayed on the display 540. When the user selects the voice memo function 1230 in the first shortcut of the displayed screen, as shown in FIG. 11B, after the call voice is recorded, information such as time and place may be automatically extracted through voice recognition from the recorded result.

The application recommendation result of the learning model may vary depending on the context information of each user used for training the learning model. However, when the application recommendation function is activated while using the call application, a voice memo function, a schedule management application, a map application, a contact application, a location sharing application, and the like may be recommended.

Figure 10:
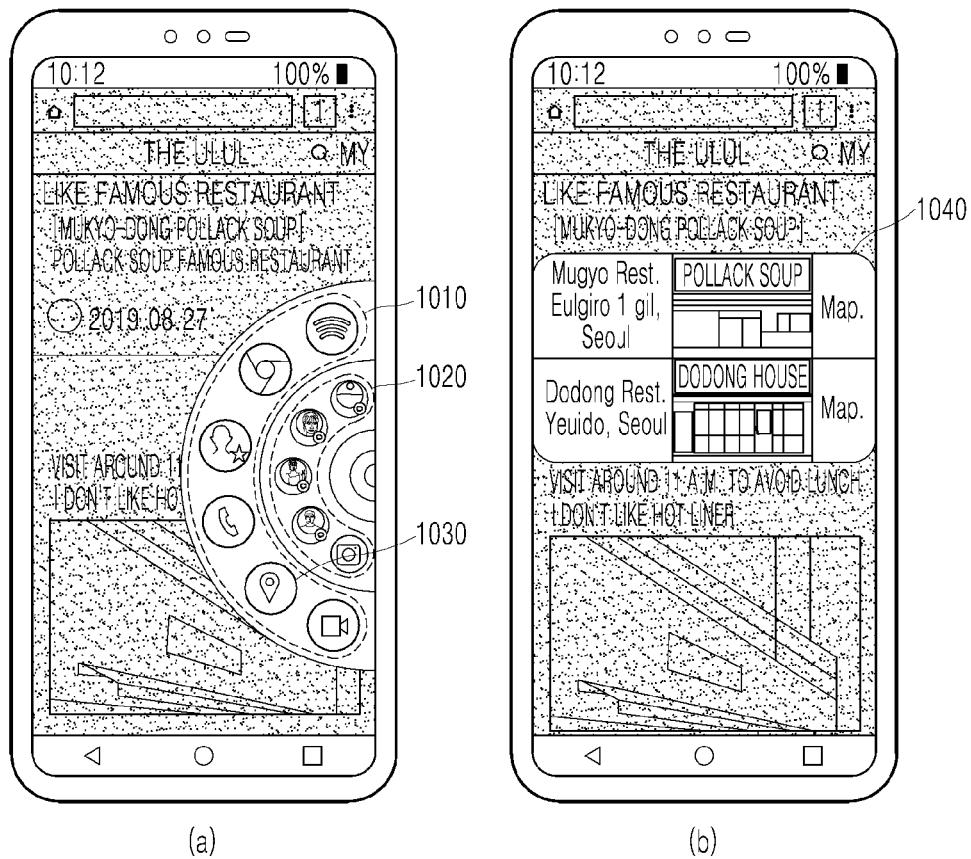
Figure 11:
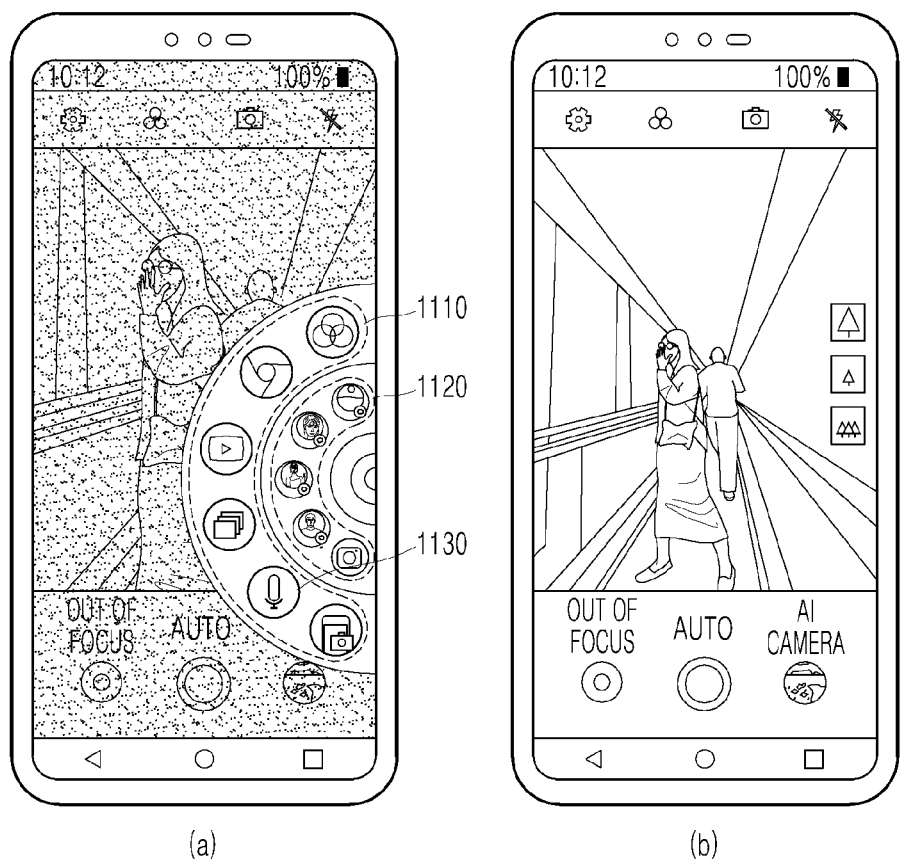
Figure 12:
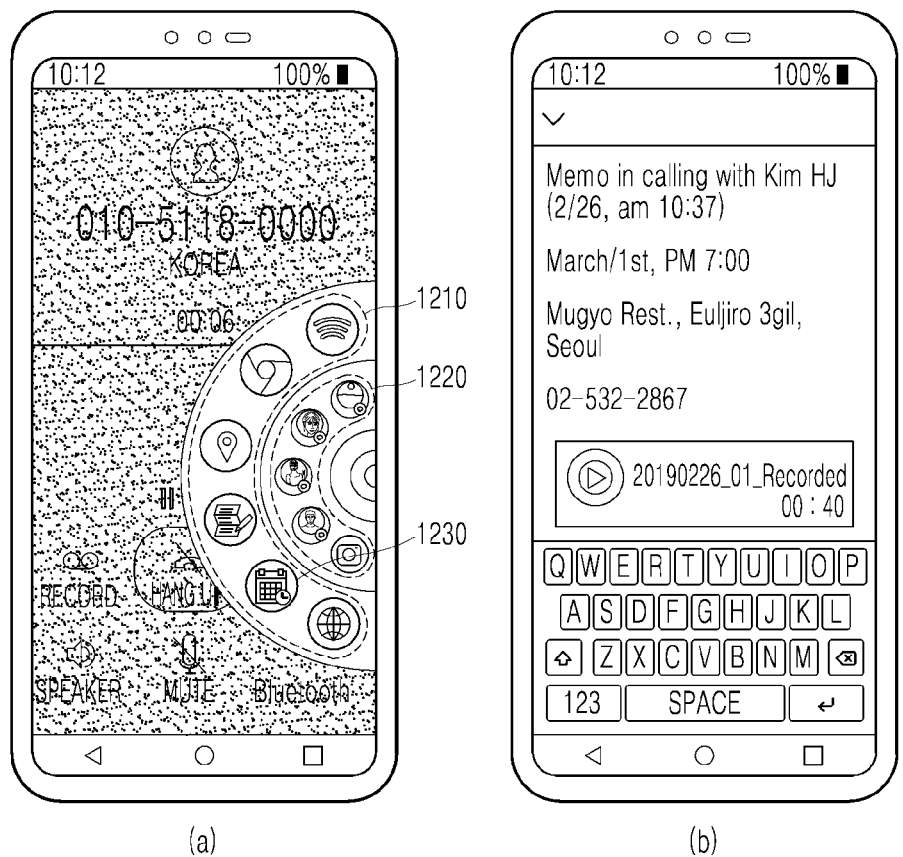

In one embodiment, referring to FIGS. 10 to 12, the preset second shortcut may be set identically to all running applications.

In another embodiment, the preset second shortcut may be set differently for each application executed by the user or by the electronic devices 100a and 100b. In this case, the second shortcut may be a shortcut for a function provided by the running application or a shortcut for a function provided by another application.

Steps performed in a method for recommending an application or a function of an application according to an embodiment of the present disclosure will be described with reference to FIGS. 13 and 14. In the following description, description of parts that are the same as those in FIG. 1 to FIG. 12 will be omitted.

Figure 13:
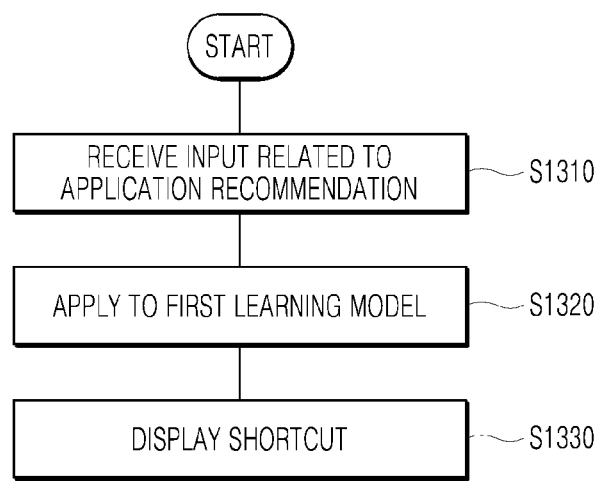
FIGS. 13 and 14 are flowcharts illustrating steps performed in a method for recommending an application or a function of an application according to an embodiment of the present disclosure.
Figure 14:
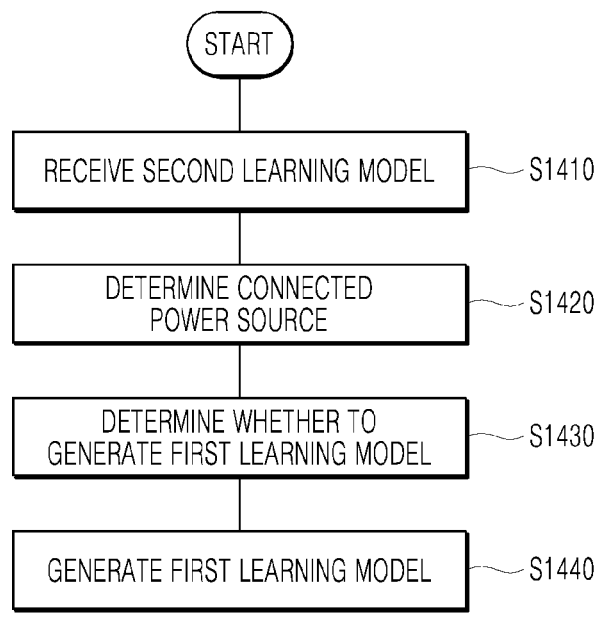

Referring to FIG. 13, in step S1310, the electronic devices 100a and 100b may receive an input for activating a function for recommending an application from a user.

In step S1320, the electronic devices 100a and 100b may apply context information including at least one of environmental information collected through a sensor or a network and usage information generated by use of the electronic devices 100a and 100b to machine learning based learning models.

In one embodiment, the learning model may be a learning model received from the server devices 200a and 200b, or may be a learning model that is re-trained using the learning model received by the electronic devices 100a and 100b from the server devices 200a and 200b as training data in which an application or an application function which a user selected is configured as a label under the condition of specific context information.

In step S1330, the electronic devices 100a and 100b may display the first shortcut related to the application determined based on the result of applying the context information to the learning model.

For example, the recommended application may be derived as a result of the context information applied to the learning model, or the user's situation (e.g., a "working" situation) may be derived as a result of applying the learning model. In the latter case, the application or function of the application related to the derived situation may be recommended as the first shortcut.

The electronic devices 100a and 100b may display, on the display, a first shortcut and a second shortcut related to a preset application or a function of the application regardless of the application result of the context information to the learning model or context information.

In another embodiment, the electronic device 100b may determine whether the electronic device 100b is connected to another device before performing step S1310, and receive a user input for operating the application recommendation function in step S1310 from the connection devices 300a and 300b through the network connected to the connection devices 300a and 300b.

In this case, the electronic device 100b controls or requests the other devices 300a and 300b to display the first shortcut and the second shortcut on the display of the other devices 300a and 300b connected to the electronic devices 100a and 100b.

In an embodiment, when it is determined that the electronic device 100b is connected to the other devices 300a and 300b, the context information inputted to the learning model may include usage information related to types of other devices 300a and 300b (e.g., 'vehicle', 'fridge', etc.), and depending on the results of applying context information to the learning model, an application related to the other devices 300a and 300b (for example, a 'navigation application', a 'music playing application', etc.) may be recommended or "driving" situation may be derived.

In one embodiment, the electronic device 100b may control or request other devices 300a and 300b to display only the shortcuts for the applications associated with the type of connected device 300a, 300b as the first shortcut among the recommended applications according to the results of applying the context information to the learning model.

After displaying the first shortcut and the second shortcut on the display, the electronic device 100a or 100b may monitor the user's reaction regarding whether the first shortcut is used, and store, as context information, steps associated with the response (e.g., steps of closing a shortcut display of the recommended application and executing another application).

In one embodiment, if the user runs another application without using the first shortcut recommended a preset number of times, run other applications without using all of the first shortcuts associated with the determined particular situation, or run other applications without using the first shortcut recommended within a particular time range and this lasts for a predetermined period of time, the electronic devices 100a and 100b may re-train the learning model. In the case of the learning model in which the electronic devices 100a and 100b re-train the learning model received from the server devices 200a and 200b, the training model can be re-trained with training data that reflects additional context information generated or stored after the training.

Steps of training the learning model received from the server device 200a or 200b by the electronic device 100a or 100b according to an embodiment of the present disclosure will be described with reference to FIG. 14.

In step S1410, the electronic devices 100a and 100b may receive a learning model from the server devices 200a and 200b, and generate and store context information including at least one of environmental information or usage information for a predetermined period of time. In this case, at least one of environmental information or usage information may be stored in association with geographic information or time information. For example, if a user runs an SNS application, by relating classification, execution time, execution place, network connected at execution, moving speed at execution, illumination at execution, and the like to each other, it can be stored as context information.

In step S1440, the electronic devices 100a and 100b may train the learning model by using the training data that labels the learning model received from the server devices 200a and 200b with information running an application or a function of an application by a user of the electronic devices 100a and 100b under the conditions of various context information.

In one embodiment, before performing the step of training the training model received from the server devices 200a and 200b, the electronic devices 100a and 100b may determine whether the electronic devices 100a and 100b are connected to a power source (for example, a power source that can continue to supply power) in order to determine whether the power supply is smooth while training the learning model in step S1420.

In another embodiment, the electronic devices 100a and 100b may determine whether the user uses the electronic devices 100a and 100b in order to train the training model while the user is not using the electronic devices 100a and 100b.

In another embodiment, in step S1430, the electronic devices 100a and 100b estimate amount of time the user is expected not to us the electronic devices 100a and 100b (e.g., a time to sleep normally based on a usage pattern of the electronic devices 100a and 100b of the user), and compare the estimated amount of time the user is expected not to use the electronic device with the estimated amount of time for training the learning model to perform the training of the learning model only when the estimated amount of time to train the training model is smaller than the estimated amount of unused time the user is expected not to use the electronic device.

In an embodiment, the electronic device 100a or 100b may transmit to the server devices 200a and 200b the difference (e.g., differences in parameters or node structures such as thresholds, weighting values, etc.) between the learning model generated after the training model and the training model before training. Accordingly, the electronic devices 100a and 100b may train the learning model without transmitting personal information to the server devices 200a and 200b, and the server devices 200a and 200b also may improve the learning models held by the server devices 200a and 200b by using differences between the learning models received from the electronic devices 100a and 100b.

In an embodiment, the electronic device 100a or 100b may transmits the trained learning model to the server device 200a or 200b or another server device (not shown), and request to map the corresponding learning model to the user's information and store it. Therefore, even if the user uses multiple electronic devices or changes the electronic device, it is advantageous in receiving the stored learning model and using the application recommendation function. In addition, the server devices 200a and 200b may be to train the received learning model in the individual cloud server and provide a function for recommending an application based on the received context information each time the electronic device 100a or 100b makes a request. In this case, a function of recommending an application stably can be provided through the limited provision of personal information.

The present disclosure described above can be embodied as computer-readable codes on a medium on which a program is recorded. The computer readable medium includes all types of recording devices in which data readable by a computer system readable can be stored. Examples of the computer readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc. Moreover, the computer may include a processor 180 of a terminal.

What is claimed is:

1. A method performed by an electronic device, the method comprising:
    applying context information to a machine learning based first learning model in response to a user input, the context information including at least one of environmental information, which is collected through a sensor of the electronic device or a network, or usage information generated by use of the electronic device;
    displaying, on a display, a first shortcut related to an application determined on a basis of a result of applying the context information to the first learning model; and
    displaying, on the display, a second shortcut related to a preset application,
    wherein the method further comprises, before receiving of the user input,
    receiving a second learning model from a first server device;
    generating and storing context information; and
    training the second learning model using training data in which a user selected application or a user selected application function is configured as a label under a condition of the stored context information to generate the first learning model,
    wherein the method further comprises, before the generating of the first learning model,
    determining whether the electronic device is connected to a power source;
    determining whether a user uses the electronic device;
    comparing an estimated amount of time the user is expected not to use the electronic device with an estimated amount time for generating the first learning model; and
    determining whether to generate the first learning model based on a result of the comparing of the estimated amount of time.

2. The method of claim 1, wherein the first learning model is a learning model trained using training data in which a user selected application or a user selected application function is configured as a label under a condition of specific context information.

3. The method of claim 1, wherein the usage information comprises at least one of call list information, message information, schedule information, application usage information, network usage information, or internet usage information.

4. The method of claim 1, further comprising:
    determining that the electronic device is connected to another device;
    receiving the user input through a network connected to the another device; and
    displaying the first shortcut or displaying the second shortcut associated with a type of the another device, on a display of the another device.

5. The method of claim 1, wherein the context information further comprises at least one of environmental information, which is collected through a sensor of another device or the network, or usage information generated by use of the another device.

6. The method of claim 1, wherein the generating and storing of the context information comprises storing at least one of the environmental information or the usage information in association with geographic information or time information.

7. The method of claim 1, wherein the displaying of the first shortcut and the second shortcut comprises displaying, on the display, an arrangement of a plurality of first shortcuts and a plurality of second shortcuts to be disposed in respectively different curves.

8. The method of claim 1, further comprising: before the displaying of the first shortcut and the displaying of the second shortcut, checking an application running on the electronic device,
wherein the second shortcut is a shortcut preset to be associated with the running application.

9. The method of claim 8, wherein the second shortcut is a shortcut to a function provided by the running application or a function provided by another application.

10. A method performed by an electronic device, the method comprising:
applying context information to a machine learning based first learning model in response to a user input, the context information including at least one of environmental information, which is collected through a sensor of the electronic device or a network, or usage information generated by use of the electronic device;
displaying, on a display, a first shortcut related to an application determined on a basis of a result of applying the context information to the first learning model; and
displaying, on the display, a second shortcut related to a preset application,
wherein the method further comprises, before receiving of the user input,
receiving a second learning model from a first server device;
generating and storing context information; and
training the second learning model using training data in which a user selected application or a user selected application function is configured as a label under a condition of the stored context information to generate the first learning model,
wherein the method further comprises, after the generating of the first learning model, transmitting information related to a difference between the first learning model and the second learning model to a second server device.

11. A method performed by an electronic device, the method comprising:
applying context information to a machine learning based first learning model in response to a user input, the context information including at least one of environmental information, which is collected through a sensor of the electronic device or a network, or usage information generated by use of the electronic device;
displaying, on a display, a first shortcut related to an application determined on a basis of a result of applying the context information to the first learning model; and
displaying, on the display, a second shortcut related to a preset application,
wherein the method further comprises, before receiving of the user input,
receiving a second learning model from a first server device;
generating and storing context information; and
training the second learning model using training data in which a user selected application or a user selected application function is configured as a label under the condition of the stored context information to generate the first learning model,
wherein the method further comprises, after the generating of the first learning model, transmitting the first learning model to a second server device and requesting to store the first learning model as associated with the user.

12. A method performed by an electronic device, the method comprising:
applying context information to a machine learning based first learning model in response to a user input, the context information including at least one of environmental information, which is collected through a sensor of the electronic device or a network, or usage information generated by use of the electronic device;
displaying, on a display, a first shortcut related to an application determined on a basis of a result of applying the context information to the first learning model; and
displaying, on the display, a second shortcut related to a preset application,
wherein the method further comprises, before receiving of the user input,
receiving a second learning model from a first server device;
generating and storing context information; and
training the second learning model using training data in which a user selected application or a user selected application function is configured as a label under the condition of the stored context information to generate the first learning model,
wherein the method further comprises, after the displaying of the first shortcut and the displaying of the second shortcut,
monitoring a response of a user to the first shortcut; and
based on the response corresponding to a preset reference, re-training the first learning model with training data reflecting additional context information generated or stored after the generating of the first learning model.

13. The method of claim 12, wherein the monitoring of the response of the user comprises monitoring whether the first shortcut is used by the user or monitoring whether an application not related to the first shortcut is used by the user.

14. A computer program product comprising a non-transitory machine readable medium having a computer readable program stored therein, wherein the computer readable program, when executed by a computing device, causes the computing device to:
apply context information to a machine learning based first learning model in response to a user input, the context information including at least one of environmental information, which is collected through a sensor of the electronic device or a network, or usage information generated by use of the electronic device;
display, on a display, a first shortcut related to an application determined on a basis of a result of applying the context information to the first learning model; and
display, on the display, a second shortcut related to a preset application, wherein the computer readable program, when executed by the computing device, further causes the computing device to, before receiving of the user input,
receive a second learning model from a first server device;
generate and store context information; and
train the second learning model using training data in which a user selected application or a user selected application function is configured as a label under a condition of the stored context information to generate the first learning model,
wherein the computer readable program, when executed by the computing device, further causes the computing device to, before the generating of the first learning model,
determine whether the electronic device is connected to a power source;
determine whether a user uses the electronic device;
compare an estimated amount of time the user is expected not to use the electronic device with an estimated amount time for generating the first learning model; and
determine whether to generate the first learning model based on a result of the comparing of the estimated amount of time.

15. An electronic device comprising:
a processor;
a memory electrically connected to the processor and configured to store at least one instruction performed in the processor and parameters of a machine learning based first learning model;
at least one sensor configured to sense physical information;
a display configured to display a user interface,
wherein the processor is configured to:
apply context information to the machine learning based first learning model in response to a user input, the context information including at least one of environmental information, which is collected through the sensor or a network, or usage information generated by use of the electronic device;
cause the display to display a first shortcut related to an application determined on a basis of a result of applying the context information to the first learning model; and
cause the display to display a second shortcut related to a preset application,
wherein the processor is further configured to, before receiving of the user input,
receive a second learning model from a first server device via the network,
train the second learning model using stored context information as training data to generate the first learning model, and
transmit information related to a difference between the first learning model and the second learning model to a second server device via the network.

16. The electronic device of claim 15, wherein the processor is further configured to:
re-train the first learning model with training data reflecting additional context information generated or stored after generating of the first learning model based on a response of a user to the first shortcut.

17. The electronic device of claim 15, wherein the processor is further configured to:
cause the display to display an arrangement of a plurality of first shortcuts and a plurality of second shortcuts to be disposed in respectively different curves.

18. The electronic device of claim 15, wherein the processor is further configured to:
check an application running on the electronic device; and
cause the display to display a shortcut preset to be associated with the running application as the second shortcut.

19. The electronic device of claim 15, wherein the processor is further configured to:
receive additional context information via the network, wherein the additional context information includes at least one of environment information of another device or usage information of the another device.

20. An electronic device, comprising:
a processor;
a memory electrically connected to the processor and configured to store at least one instruction performed in the processor and parameters of a machine learning based first learning model;
at least one sensor configured to sense physical information;
wherein the processor is configured to:
apply context information to the machine learning based first learning model in response to a user input received from another device through a network, the context information including at least one of environmental information;
cause the another device to display a first shortcut related to an application determined on a basis of a result of applying the context information to the first learning model;
cause the another device to display a second shortcut related to a preset application,
wherein, the environmental information is collected through the sensor of the electronic device or the network of the electronic device, or usage information generated by use of the electronic device,
wherein the another device is connected to the electronic device, uses a function of the electronic device and displays output of the function of the electronic device,
wherein the processor is further configured to, before receiving of the user input,
receive a second learning model from a first server device;
generate and store the context information; and
train the second learning model using training data in which a user selected application or a user selected application function is configured as a label under a condition of the stored context information to generate the first learning model,
wherein the processor is further configured to, before the generating of the first learning model,
determine whether the electronic device is connected to a power source;
determine whether a user uses the electronic device;
compare an estimated amount of time the user is expected not to use the electronic device with an estimated amount time for generating the first learning model; and
determine whether to generate the first learning model based on a result of the comparing of the estimated amount of time.

21. The electronic device of claim 20, wherein the second shortcut displayed on the another device is associated with an application preset in relation to the another device.

* * * * *